9130X
PATENTED SEPT. 26, 1835.
S. W. WATSON & C. ROBINSON.
FORGE.
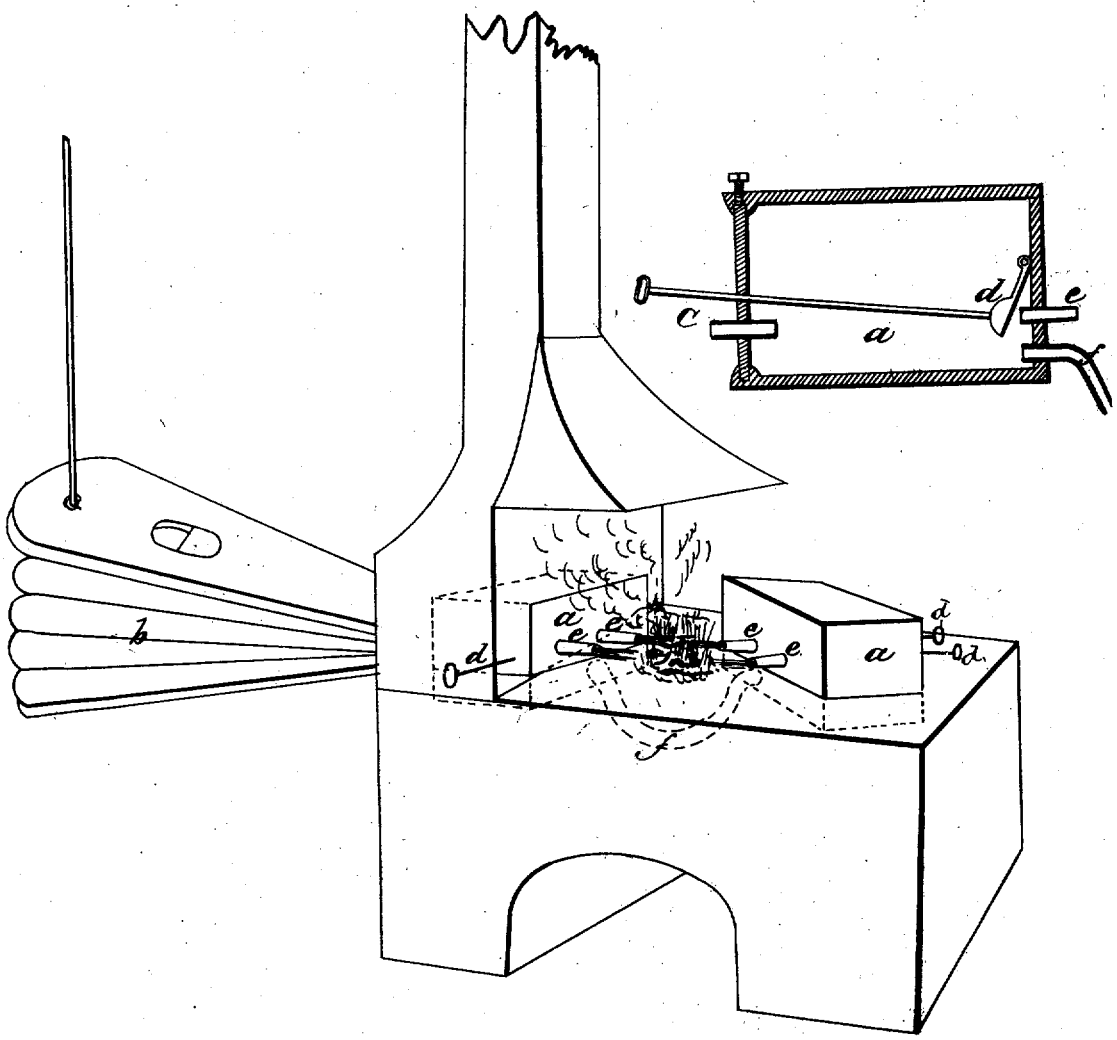

Dec 26 1833 9130X 341.

Seth. W. Watson & Cloud Robinson
Ashtabula New York.

Letters Patent

The Schedule refered to in these Letters Patent and making part of the same containing a description in the words of the said Seth W Watson and Cloud Robinson themselves of their improvement in the ~~the~~ application of air to forges and other Furnaces To all people to whom these presents shall come.
Be it known that We Seth W Watson and Cloud Robinson both of Ashtabula in the County of Ashtabula and State of Ohio have invented a new and useful improvement in the method of applying air for the blowing of fire as used by Smiths and other Mechanics for the working of metals and other like purposes and that the following is a full and exact description thereof viz. — The apparatus is intended to be placed in the chimney and forge and consists of two boxes of cast iron or other metallick substance, clay or stone, each box to be nine inches high six inches wide and five inches thick. one of which Boxes is placed in the chimney back and receives the nose of the Bellows at the back side, which back side consis of a plate of the same material and of the size of that side of the Box and let onto the Box by grooves and fastend to the box by means of a screw near the top of the box this box first receives the air from the bellows and the front of it next to the fire bed is perforated with one or more holes with a protuberance on the front & inside of the Box like a tube through which the air is let to the fire from this Box. Also in this Box is a cap or caps corresponding to the hole or holes through which the air is let to the fire as aforesaid intended for the purpose of stopping said holes or tubes ~~or tubes~~. or slides constructed to cover the inside front of the tubes or holes aforesaid with a wire or wires attached to said Caps or slides and passing through the back or side of said Box by means of which wire or wires the said caps or slides are drawn over or removed from said tubes or holes and the air stopped or permitted to pass through said holes or tubes in greater or

9130X smaller quantities. On the front side of this Box and nearly at the bottom is a hole or opening communicating with the inside of the Box of diameter suf ficient to secure the tube hereinafter mentioned as connecting the two boxes the other box is placed in front of the Box just described and ten or twelve inches or other convenient distance therefrom and is the same in construction with the other Box (first described) Except that it has no opening at its back for the reception of air from the Bellows but having the same holes or tubes for letting the air to the fire in front and the same opening at its front side for the reception of the tube next herein mentioned. between these boxes and below the fire bed passes a tube of the same material with the Boxes of one inch and one half or other convenient diameter (but lar ger than the tubes or holes through which the air passes to the fire) connecting and passing into each of said Boxes through which tube the air passes from the first to the second described Box the boxes are also connected by bars or Rods of iron passing from back to back of each Box near the bottom and fastened at one end by a screw the boxes and tubes to be air tight — What we claim as our own invention and not previously known in the above described improvement is the principle and mode of conveying the air to the Box secondly above described from the Box first above described so as to let the air to the fire in counter currents and in appropriate directions from the same Bellows.

Signed in presence of
Horace Wilder
Eli T. Wilder

Seth W. Watson
Cloud Robinson

[illegible]
Chf.W.

750 [illegible]